(12) United States Patent
Shiotsu et al.

(10) Patent No.: US 12,253,311 B2
(45) Date of Patent: Mar. 18, 2025

(54) HEAT EXCHANGER AND WATER HEATING DEVICE INCLUDING THE SAME

(71) Applicant: NORITZ CORPORATION, Hyogo (JP)

(72) Inventors: Naoya Shiotsu, Akashi (JP); Norihide Wada, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 322 days.

(21) Appl. No.: 17/861,256

(22) Filed: Jul. 11, 2022

(65) Prior Publication Data

US 2023/0026734 A1 Jan. 26, 2023

(30) Foreign Application Priority Data

Jul. 20, 2021 (JP) ................. 2021-119431

(51) Int. Cl.
| | | |
|---|---|---|
| F24H 1/14 | (2022.01) | |
| F28D 1/047 | (2006.01) | |
| F28D 7/08 | (2006.01) | |
| F28F 1/10 | (2006.01) | |
| F28F 9/013 | (2006.01) | |

(52) U.S. Cl.
CPC ........... *F28D 1/0477* (2013.01); *F24H 1/145* (2013.01); *F28D 7/082* (2013.01); *F28F 1/10* (2013.01); *F28F 9/013* (2013.01); *F28F 2275/04* (2013.01)

(58) Field of Classification Search
CPC .......... F28D 7/082; F28D 7/085; F28D 7/087; F28F 9/013; F24H 9/145
See application file for complete search history.

(56) References Cited

U.S. PATENT DOCUMENTS

| | | | | |
|---|---|---|---|---|
| 2,112,041 A | * | 3/1938 | Miller ................. | F24F 6/04 |
| | | | | 126/299 F |
| 2019/0226719 A1 | * | 7/2019 | Shiotsu ................. | F24H 1/403 |
| 2019/0368818 A1 | * | 12/2019 | Wada ................. | F24H 9/16 |

FOREIGN PATENT DOCUMENTS

| | | |
|---|---|---|
| JP | 4246749 | 4/2009 |
| JP | 2013047575 | 3/2013 |
| JP | 2019158235 | 9/2019 |
| JP | 2020070937 | 5/2020 |

* cited by examiner

*Primary Examiner* — Eric S Ruppert
(74) *Attorney, Agent, or Firm* — JCIPRNET

(57) ABSTRACT

A heat exchanger includes: a case which has a first side wall that stands upright in a vertical height direction and to which a heating medium is supplied inside; and heat transfer tubes for heating hot water housed in the case. Two end portions of the heat transfer tubes in a longitudinal direction are joined to the first side wall via brazing portions, and the heat transfer tubes are supported by the first side wall. The heat exchanger further includes heat transfer tube support portions provided on the first side wall for supporting portions of the heat transfer tubes near the first side wall to prevent the portions of the heat transfer tubes near the first side wall from descending below a first predetermined height.

15 Claims, 14 Drawing Sheets ature 1, it is possible to prevent distortion of the heat transfer tube during the brazing work even when the case does not have a bottom wall, and it is possible to solve the problems described in regard to Patent Literature 1.

HEAT EXCHANGER AND WATER HEATING DEVICE INCLUDING THE SAME

CROSS-REFERENCE TO RELATED APPLICATION

This application claims the priority benefits of Japanese application no. 2021-119431, filed on Jul. 20, 2021. The entirety of the above-mentioned patent application is hereby incorporated by reference herein and made a part of this specification.

BACKGROUND

Technical Field

The disclosure relates to a heat exchanger of a type that is used as a component of a water heating device such as a hot water supply device and heats hot water by recovering heat from a heating medium such as combustion gas using a heat transfer tube, and relates to a water heating device including the same.

Description of Related Art

A heat exchanger that houses a heat transfer tube in a case, to which a heating medium such as combustion gas is supplied, and can heat hot water flowing in the heat transfer tube is widely known as the heat exchanger used in a water heating device. Specific examples of such heat exchangers are described in Patent Literatures 1 and 2, for example. In the heat exchangers described in Patent Literatures 1 and 2, a plurality of holes are provided in a predetermined side wall of the case, and two end portions of the heat transfer tube in the longitudinal direction are inserted into the plurality of holes to be brazed. In such a configuration, the heat transfer tube is in a state of being supported by the side wall of the case, so if no measures are taken, there is a risk that each portion of the intermediate portion of the heat transfer tube in the longitudinal direction may descend due to its own weight and cause distortion when the above-mentioned brazing is performed to manufacture the heat exchanger. If the brazing work is carried out in such a distorted state, there is a risk that the distortion may have an effect even after the brazing work is finished, and a large error may occur in the arrangement of each portion of the heat transfer tube. Since this causes problems such as a decrease in the heat exchange efficiency, it is necessary to appropriately avoid the risk described above. If the orientation or posture of the heat exchanger can be changed as appropriate to prevent the heat transfer tube from being displaced greatly due to the influence of its own weight during the brazing work, the above-mentioned problems can be solved, but for various reasons, such measures may not be realized.

Therefore, in the means shown in FIG. 8 of Patent Literature 1, an upward convex portion for supporting the heat transfer tube is provided on the bottom wall of the case. This makes it possible to prevent displacement of the heat transfer tube. However, depending on the specifications of the heat exchanger, the bottom of the case may be open and the case may not have a bottom wall. In such a case, it is difficult to provide the above-mentioned upward convex portion. Besides, when the heat transfer tube is arranged considerably above the bottom wall of the case, it is necessary to increase the size of the upward convex portion provided on the bottom wall, which also causes problems such as an increase in the weight of the case.

In contrast, in Patent Literature 2, the side wall of the case or an auxiliary member arranged on the inner side of the side wall is provided with a heat transfer tube support portion for contacting the heat transfer tube and supporting the contact part. According to such a configuration, unlike Patent Literature 1, it is possible to prevent distortion of the heat transfer tube during the brazing work even when the case does not have a bottom wall, and it is possible to solve the problems described in regard to Patent Literature 1.

However, in Patent Literature 2, there is still room for improvement as described below. That is, in Patent Literature 2, the heat transfer tube support portion is provided on the side wall of the case or the auxiliary member arranged on the inner side of the side wall, but the side wall of the case described above is not a side wall (first side wall) to which two end portions of the heat transfer tube in the longitudinal direction are brazed and is a side wall different from it. Therefore, it may be difficult for the heat transfer tube support portion to appropriately prevent the portion of the heat transfer tube near the first side wall from being distorted in a state of descending due to its own weight. As a result, in Patent Literature 2, the heat transfer tube may still be brazed to the side wall of the case in a distorted state and cause an error in the arrangement of the heat transfer tube.

RELATED ART

Patent Literatures

[Patent Literature 1] Japanese Patent Laid-Open No. 2013-47575 (FIG. 8)
[Patent Literature 2] Japanese Patent Laid-Open No. 2020-70937
[Patent Literature 3] Japanese Patent No. 4246749
[Patent Literature 4] Japanese Patent Laid-Open No. 2019-158235

SUMMARY

Problems to be Solved

The disclosure provides a heat exchanger that can appropriately prevent or suppress a heat transfer tube from being brazed in an unreasonably distorted state due to its own weight so as to prevent a large error in the arrangement of the heat transfer tube, and provides a water heating device including the same.

Means for Solving the Problems

The following technical means are taken in the disclosure.

A heat exchanger provided according to the first aspect of the disclosure includes: a case which has a first side wall that stands upright in a vertical height direction and to which a heating medium is supplied inside; and a heat transfer tube for heating hot water, which is housed in the case. Two end portions of the heat transfer tube in a longitudinal direction are joined to the first side wall via a brazing portion, and the heat transfer tube is supported by the first side wall. The heat exchanger further includes a heat transfer tube support portion which is provided on the first side wall for supporting a portion of the heat transfer tube near the first side wall so as to prevent the portion of the heat transfer tube near the first side wall from descending below a first predetermined height.

According to such a configuration, during the brazing work in the manufacturing process of the heat exchanger, the portion of the heat transfer tube near the first side wall is appropriately prevented from greatly descending due to its own weight by using the heat transfer tube support portion provided on the first side wall of the case. As a result, it is possible to prevent or suppress the heat transfer tube from being brazed in a greatly distorted state, and prevent a large error from occurring in the arrangement of the heat transfer tube. During the brazing work, the orientation or posture of the heat exchanger may be set to the original orientation or posture when it is used, which also has excellent flexibility.

In the disclosure, the heat transfer tube support portion may be formed as a convex portion integrally formed on the first side wall so that a part of the first side wall partially protrudes toward an inner side of the case.

According to such a configuration, by applying press processing to partially form a convex portion on the first side wall of the case, the heat transfer tube support portion can be easily and rationally provided on the first side wall. It is not necessary to configure the heat transfer tube support portion with a separate member. Therefore, the number of parts and the weight do not increase, and an increase in the manufacturing costs can also be suppressed. Further, the formation of the heat transfer tube support portion can be expected to have an effect of improving the strength of the first side wall of the case.

In the disclosure, the case may have a second side wall which faces the first side wall and is separated from the first side wall, and the heat exchanger may further include a heat transfer tube support body for supporting a portion of the heat transfer tube near the second side wall so as to prevent the portion near the second side wall from descending below a second predetermined height.

According to such a configuration, during the brazing work, not only the portion of the heat transfer tube near the first side wall but also the portion near the second side wall is appropriately prevented from greatly descending due to its own weight. Therefore, it is possible to more thoroughly prevent the heat transfer tube from being brazed in an unreasonably distorted state.

In the disclosure, the heat transfer tube support body may have a configuration which has a plate-shaped portion located in the case in a posture of standing upright in the vertical height direction that is a flow direction of the heating medium, and in which the plate-shaped portion is formed with an opening for inserting the portion of the heat transfer tube near the second side wall.

According to such a configuration, it is possible to accurately position and fix the portion of the heat transfer tube near the second side wall (prevent distortion) while simplifying the configuration of the heat transfer tube support body. Further, it is possible to prevent the plate-shaped portion of the heat transfer tube support body from greatly obstructing the flow of the heating medium.

In the disclosure, the heat exchanger may include, as the heat transfer tube, a plurality of serpentine heat transfer tubes in which a plurality of straight tube bodies, which extend in a direction intersecting the vertical height direction and are arranged at intervals in the vertical height direction, are connected in a series via a plurality of connecting tube bodies. The plurality of heat transfer tubes are arranged in a width direction of the case. The heat exchanger may include, as the heat transfer tube support portion, a plurality of heat transfer tube support portions which opposingly contact or opposingly approach lower surface portions of the plurality of connecting tube bodies, located near the first side wall, of the plurality of heat transfer tubes. Here, the "direction intersecting the vertical height direction" referred to in the disclosure includes a direction that is vertically inclined at an appropriate angle with respect to the horizontal direction, in addition to the horizontal direction.

According to such a configuration, by utilizing the plurality of serpentine heat transfer tubes described above, the amount of heat recovered from the heating medium can be increased, which is preferable in improving the heat exchange efficiency of the heat exchanger. Furthermore, during the brazing work, the plurality of connecting tube bodies, located near the first side wall, of the plurality of heat transfer tubes are appropriately prevented from unreasonably descending due to their own weights by the plurality of heat transfer tube support portions.

In the disclosure, at least one heat transfer tube support portion of the plurality of heat transfer tube support portions may be provided in a form which extends in the width direction of the case so as to opposingly contact or opposingly approach the lower surface portions of the plurality of connecting tube bodies.

According to such a configuration, the total number of the plurality of heat transfer tube support portions can be reduced and the configuration can be simplified, which is preferable for facilitating the forming work of the heat transfer tube support portions.

In the disclosure, an additional heat transfer tube may be arranged in a region different from an arrangement region of the heat transfer tube in the case, and heat recovery from the heating medium may be enabled by both of the heat transfer tubes and the additional heat transfer tube. The additional heat transfer tube may have a plurality of tube bodies which penetrate through a plurality of fins arranged in the direction intersecting the vertical height direction, and the plurality of tube bodies and the plurality of fins may be joined to each other via an additional brazing portion.

The heat exchanger having such a configuration can recover heat from the heating medium by using both the heat transfer tube and the additional heat transfer tube, which is preferable for improving the heat exchange efficiency of the heat exchanger. Further, in order to appropriately form the additional brazing portion for joining the plurality of tube bodies of the additional heat transfer tube to the plurality of fins, it is desirable to set the posture of the heat exchanger so that the plurality of tube bodies are horizontal, and then place a brazing material on the upper portion of the tube body to heat and melt the brazing material. According to the disclosure, in such a case, it is possible to appropriately prevent the portion of the heat transfer tube near the first side wall from greatly descending due to its own weight.

A water heating device provided according to the second aspect of the disclosure includes the heat exchanger provided according to the first aspect of the disclosure.

According to such a configuration, it is possible to achieve the same effects as described with respect to the heat exchanger provided according to the first aspect of the disclosure.

Other features and advantages of the disclosure will become more apparent from the description of embodiments of the disclosure provided below with reference to the accompanying drawings.

Figure 1:
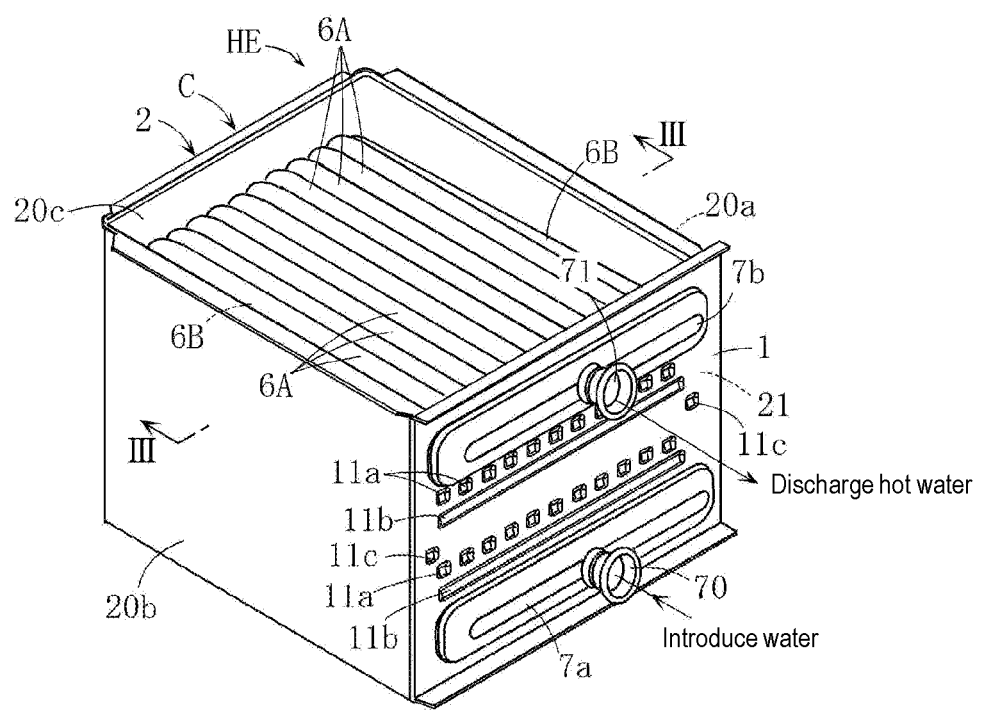
FIG. 1 is a schematic perspective view showing an example of the heat exchanger according to the disclosure.
Figure 3:
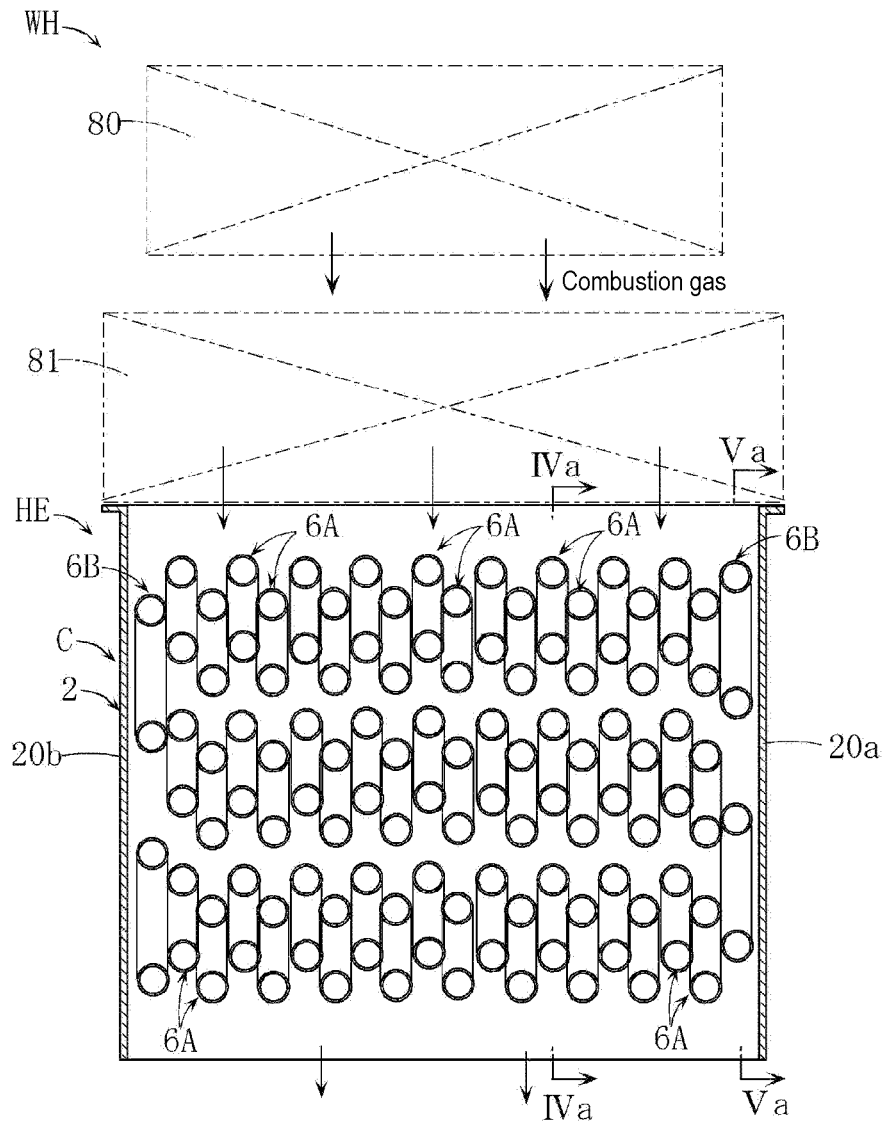
FIG. 3 is an explanatory view showing an example of the water heating device using the heat exchanger of FIG. 1, and the cross-sectional view shown by the solid lines in the figure corresponds to a cross-sectional view taken along III-III of FIG. 1.
Figure 4:
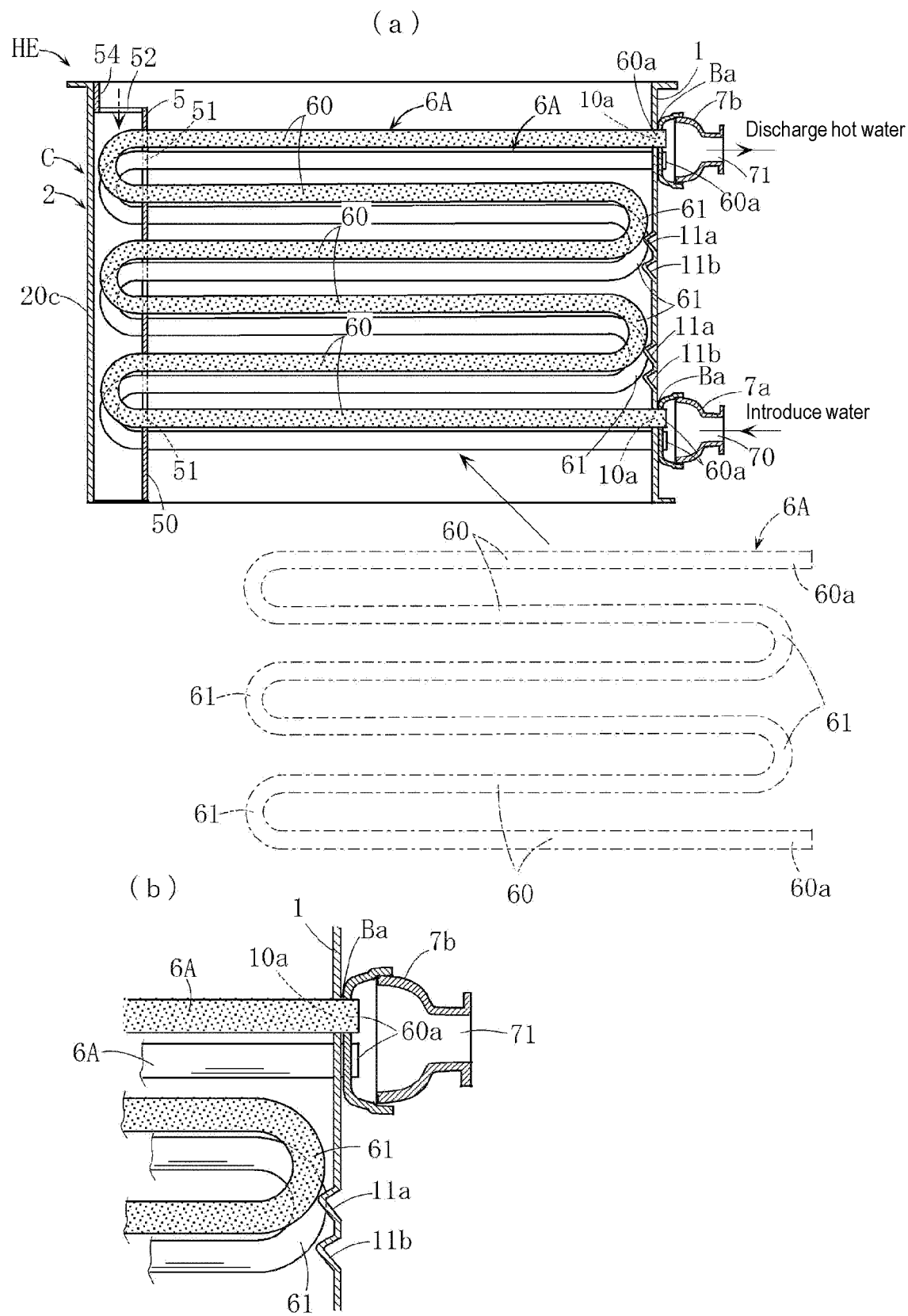
Figure 5:
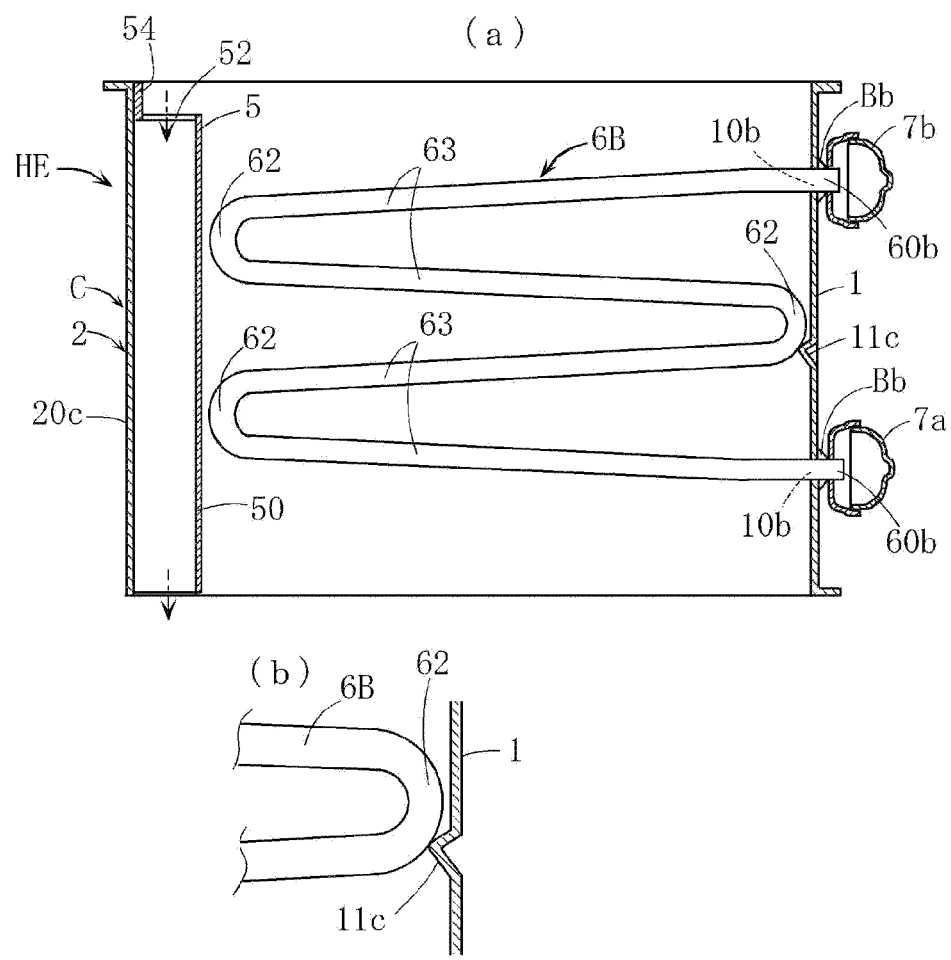
Figure 6:
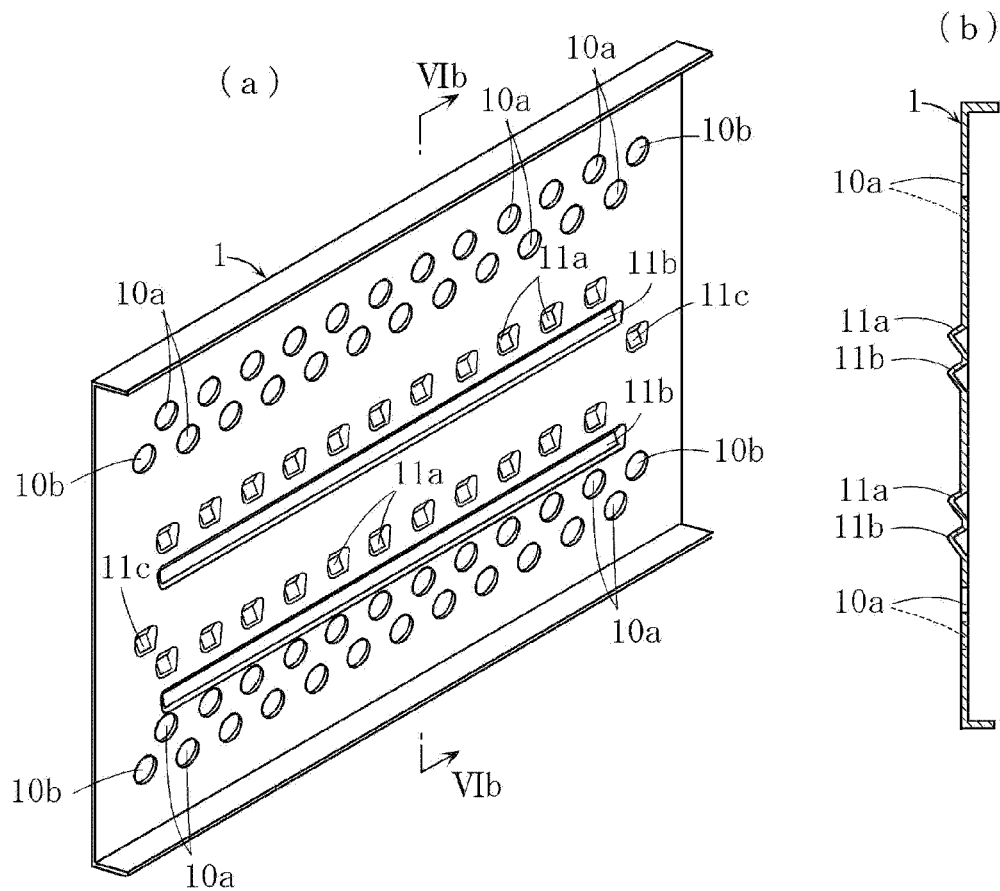
Figure 7:
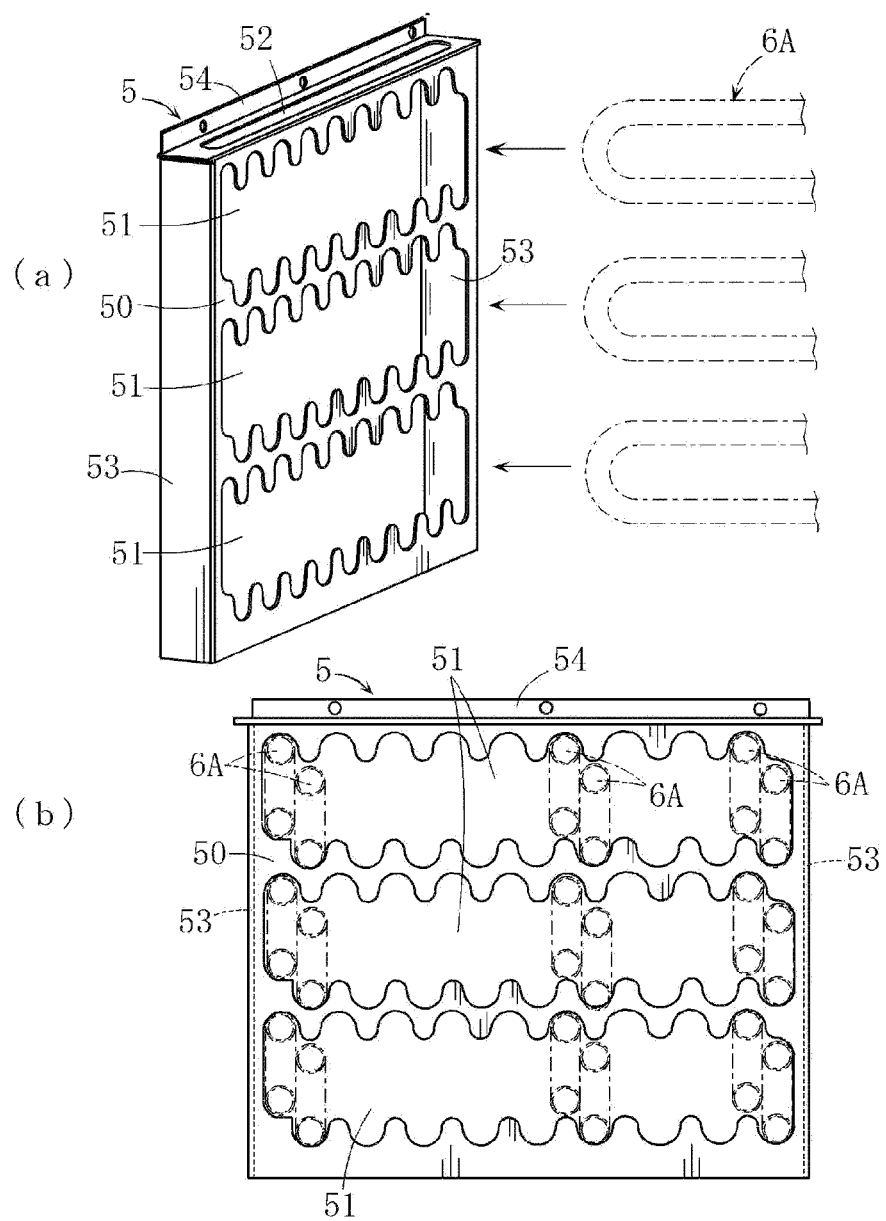
Figure 8:
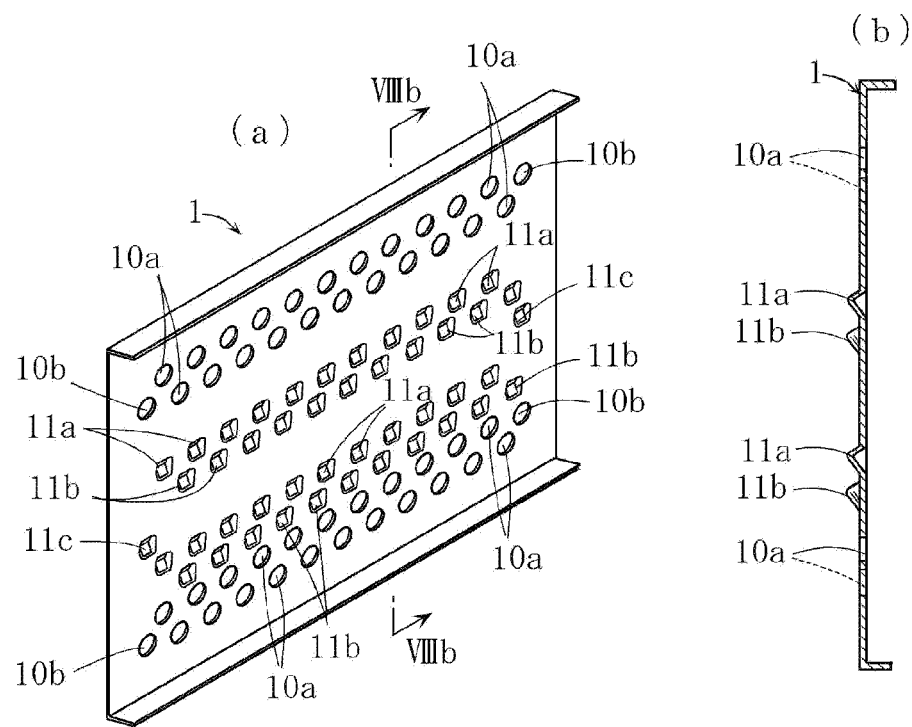

- (a) of FIG. 4 is a cross-sectional view taken along IVa-IVa of FIG. 3, and (b) of FIG. 4 is a partially enlarged cross-sectional view of (a).
- (a) of FIG. 5 is a cross-sectional view taken along Va-Va of FIG. 3, and (b) of FIG. 5 is a partially enlarged cross-sectional view of (a).
- (a) of FIG. 6 is a perspective view as a component view of the first side wall of the heat exchanger shown in FIG. 1, and (b) of FIG. 6 is a cross-sectional view taken along VIb-VIb of (a).
- (a) of FIG. 7 is a perspective view as a component view of the heat transfer tube support body incorporated in the heat exchanger shown in FIG. 1, and (b) of FIG. 7 is a front view of (a).
- (a) of FIG. 8 is a perspective view showing another example of the first side wall, and (b) of FIG. 8 is a cross-sectional view taken along VIIIb-VIIIb of (a).

Figure 9:
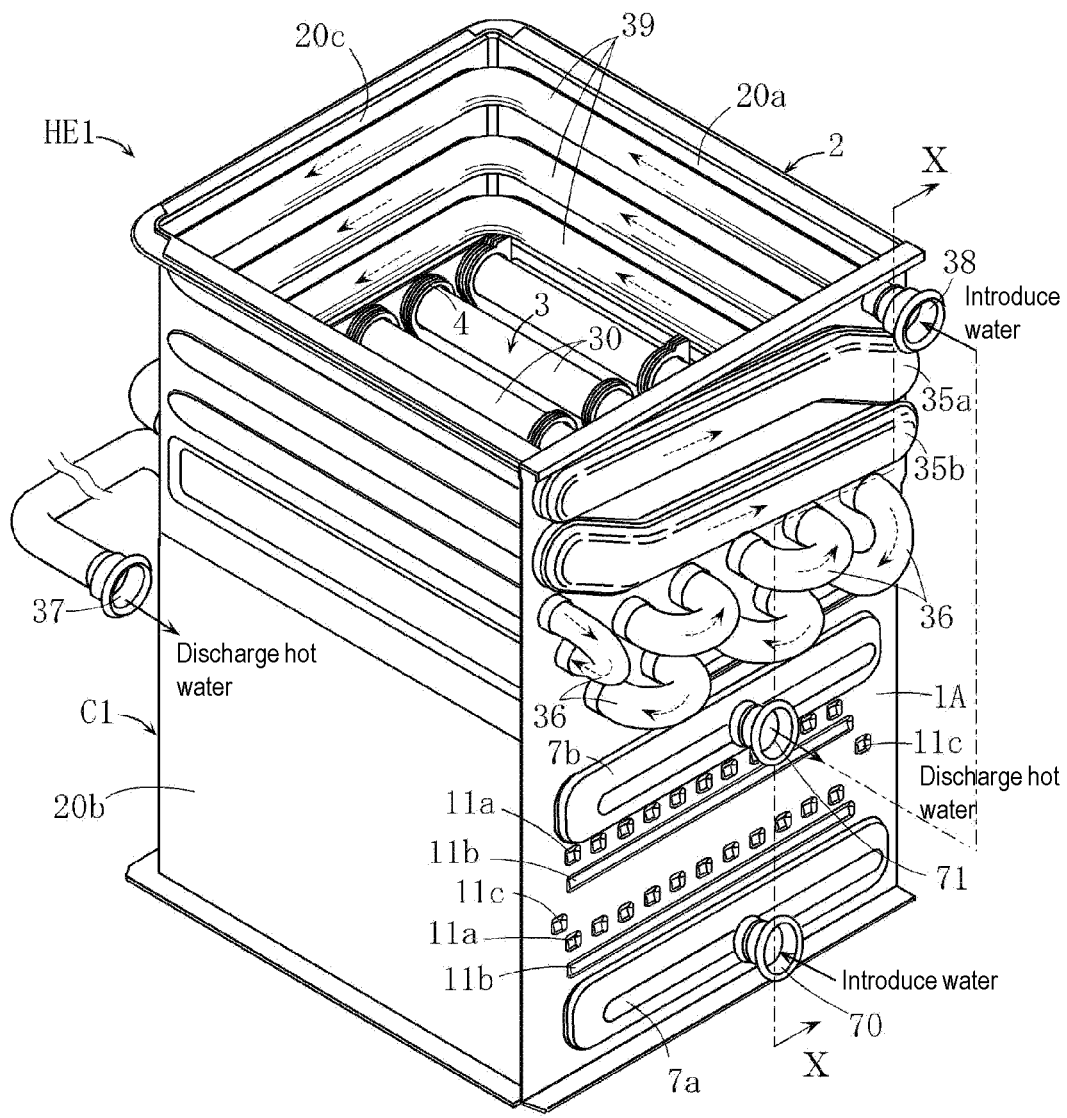

FIG. 9 is a schematic perspective view showing another example of the heat exchanger according to the disclosure.

Figure 10:
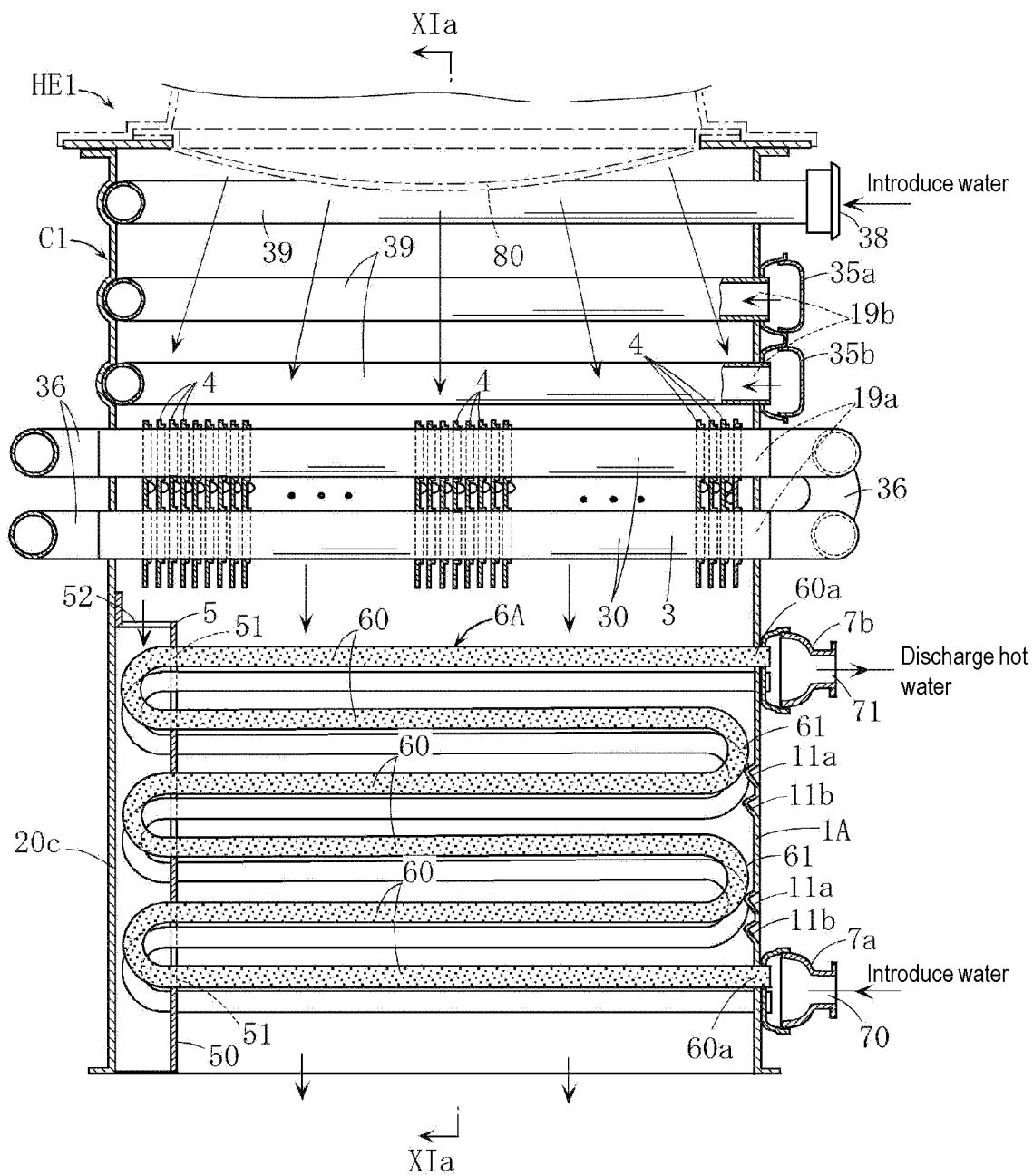

FIG. 10 is a cross-sectional view taken along X-X of FIG. 9.

Figure 11:
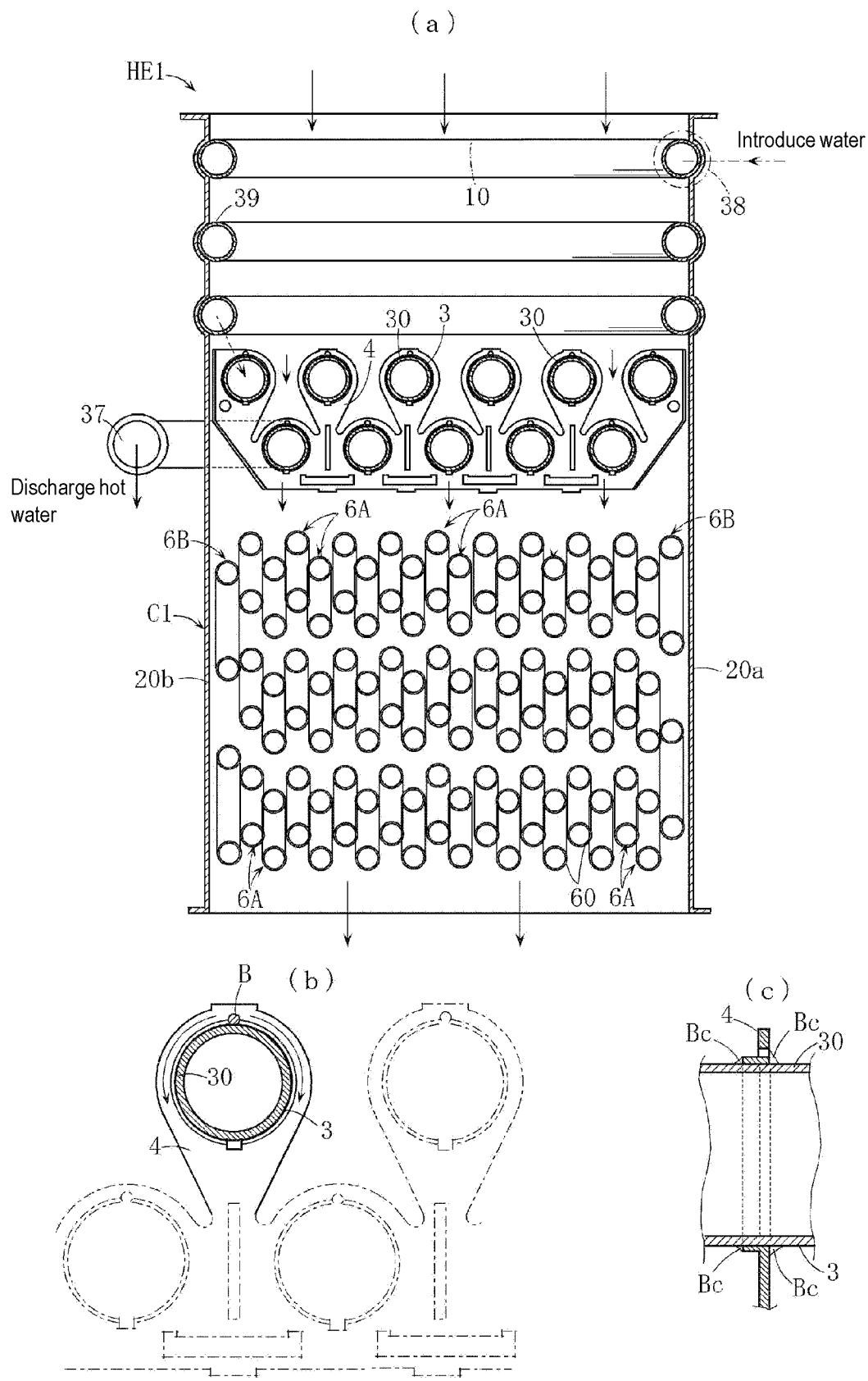

- (a) of FIG. 11 is a cross-sectional view taken along XIa-XIa of FIG. 10, (b) of FIG. 11 is an explanatory view of a state where the fin and the heat transfer tube shown in (a) are brazed, and
- (c) of FIG. 11 is a cross-sectional view of main components showing an example of the brazing portion (additional brazing portion) formed by the brazing of (b).

Figure 12:
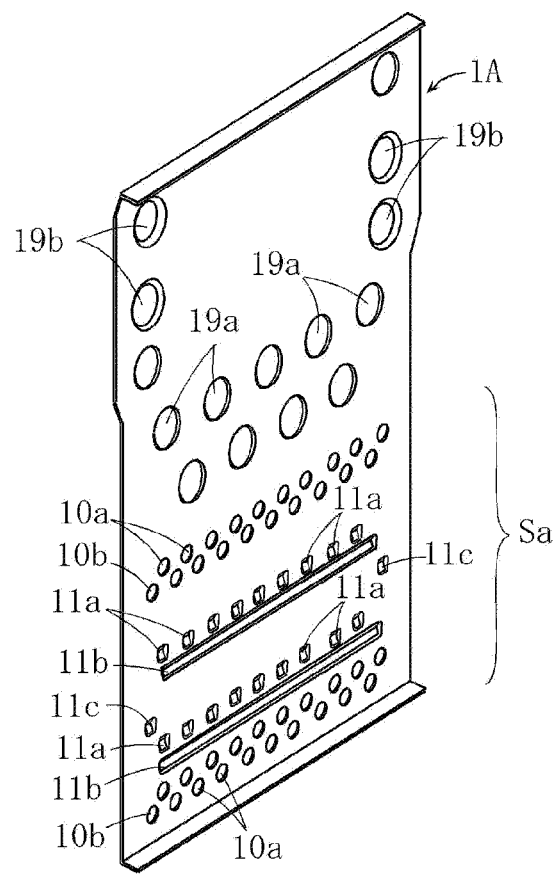

FIG. 12 is a perspective view as a component view of the first side wall of the heat exchanger shown in FIG. 9.

Figure 13:
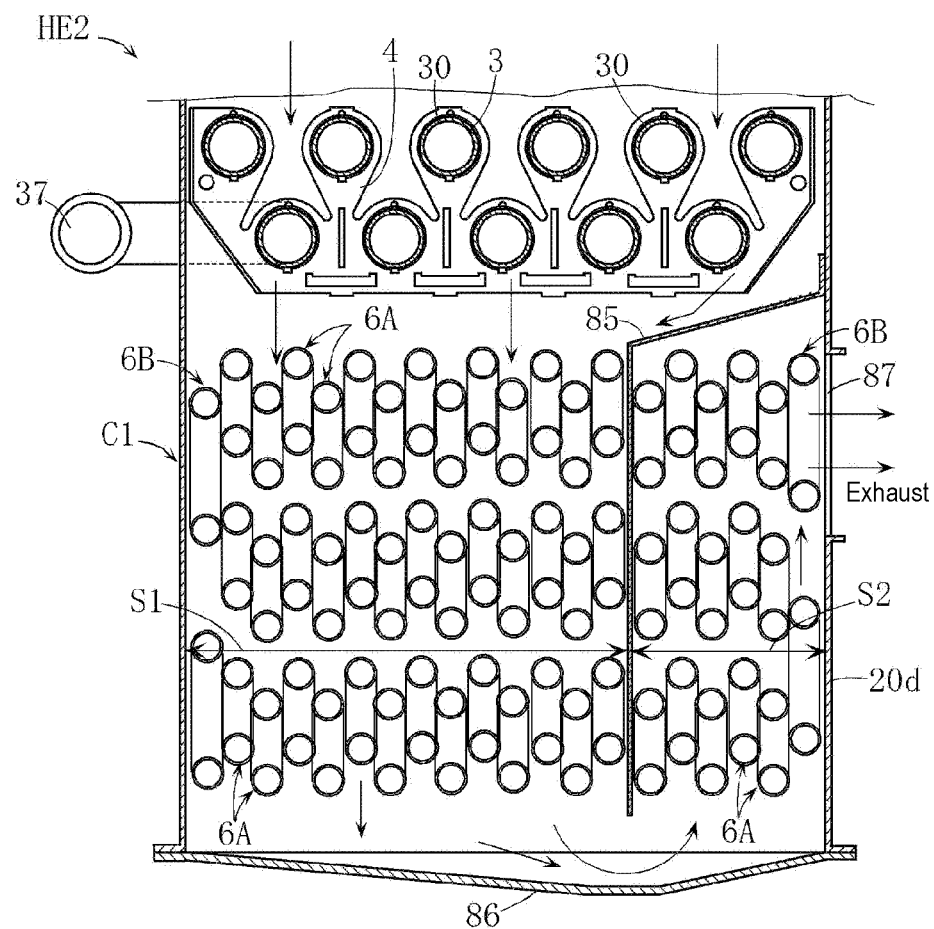

FIG. 13 is a cross-sectional view of main components showing another example of the heat exchanger of the disclosure.

Figure 14:
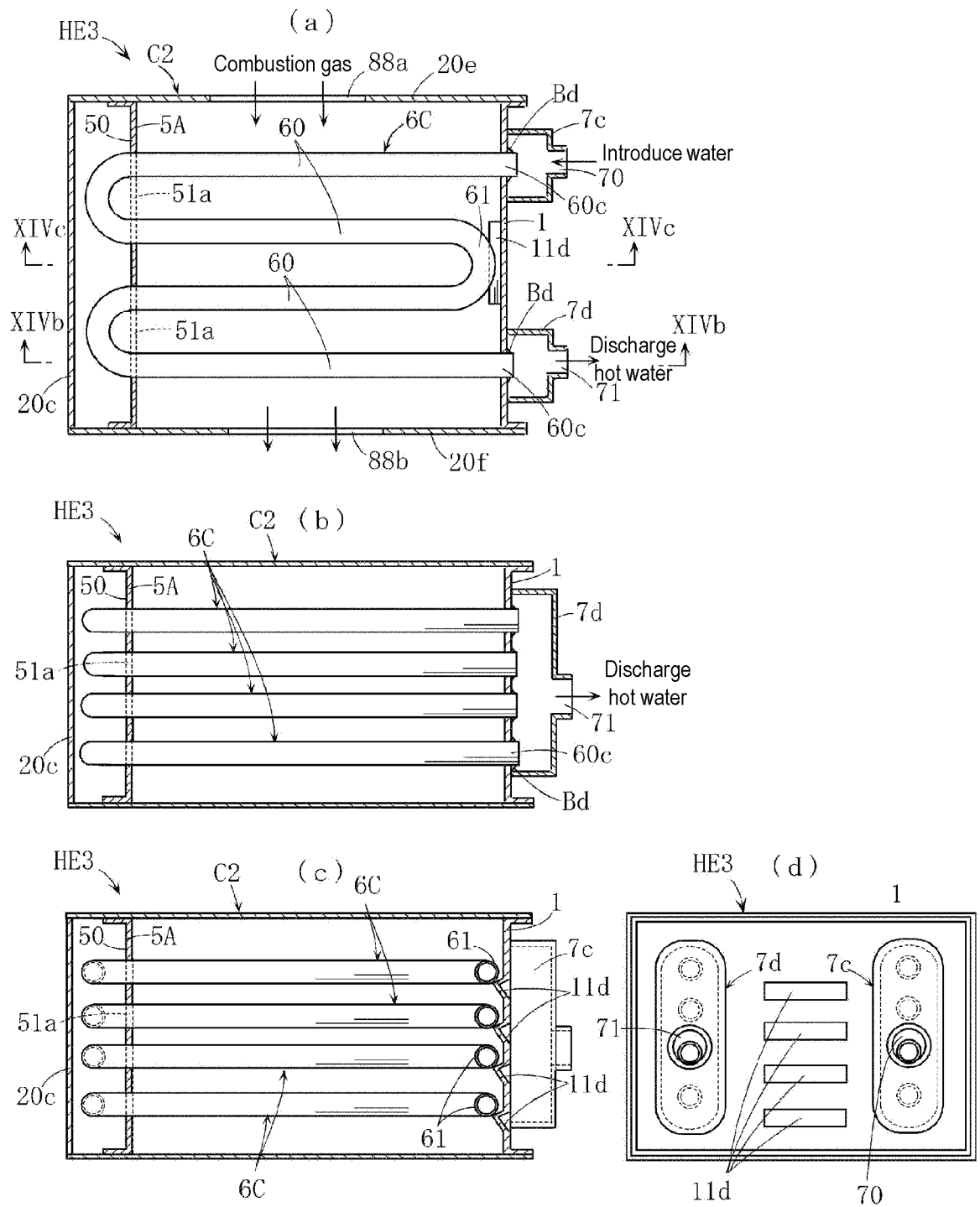

- (a) of FIG. 14 is a plan cross-sectional view showing another example of the heat exchanger according to the disclosure, (b) of FIG. 14 is a cross-sectional view taken along XIVb-XIVb of (a), (c) of FIG. 14 is a cross-sectional view taken along XIVc-XIVc of (a), and (d) of FIG. 14 is a right side view of (c).

DESCRIPTION OF THE EMBODIMENTS

Hereinafter, exemplary embodiments of the disclosure will be described specifically with reference to the drawings.

A heat exchanger HE shown in FIG. 1 to FIG. 5 includes a substantially rectangular cylindrical or frame-shaped case C having an open upper surface portion and an open lower surface portion, a plurality of first and second heat transfer tubes 6A and 6B arranged in the case C, a pair of header portions 7a and 7b for introducing water and discharging hot water, and a support body 5 for heat transfer tube.

As shown in FIG. 3, a water heating device WH using the heat exchanger HE has, for example, a configuration in which a burner 80 and the other heat exchanger 81 are provided on the upper side of the case C. The other heat exchanger 81 is a primary heat exchanger for recovering sensible heat, and for example, has the same configuration as a heat exchange unit using an additional heat transfer tube 3 described later. In contrast, the heat exchanger HE is a secondary heat exchanger for recovering latent heat. In the water heating device WH, the combustion gas (heating medium) generated by the burner 80 travels downward and sequentially passes through the heat exchangers 81 and HE, so that sensible heat and latent heat are sequentially recovered from the combustion gas, hot water is heated by the recovered heat, and the hot water is supplied to a desired hot water supply destination.

Figure 2:
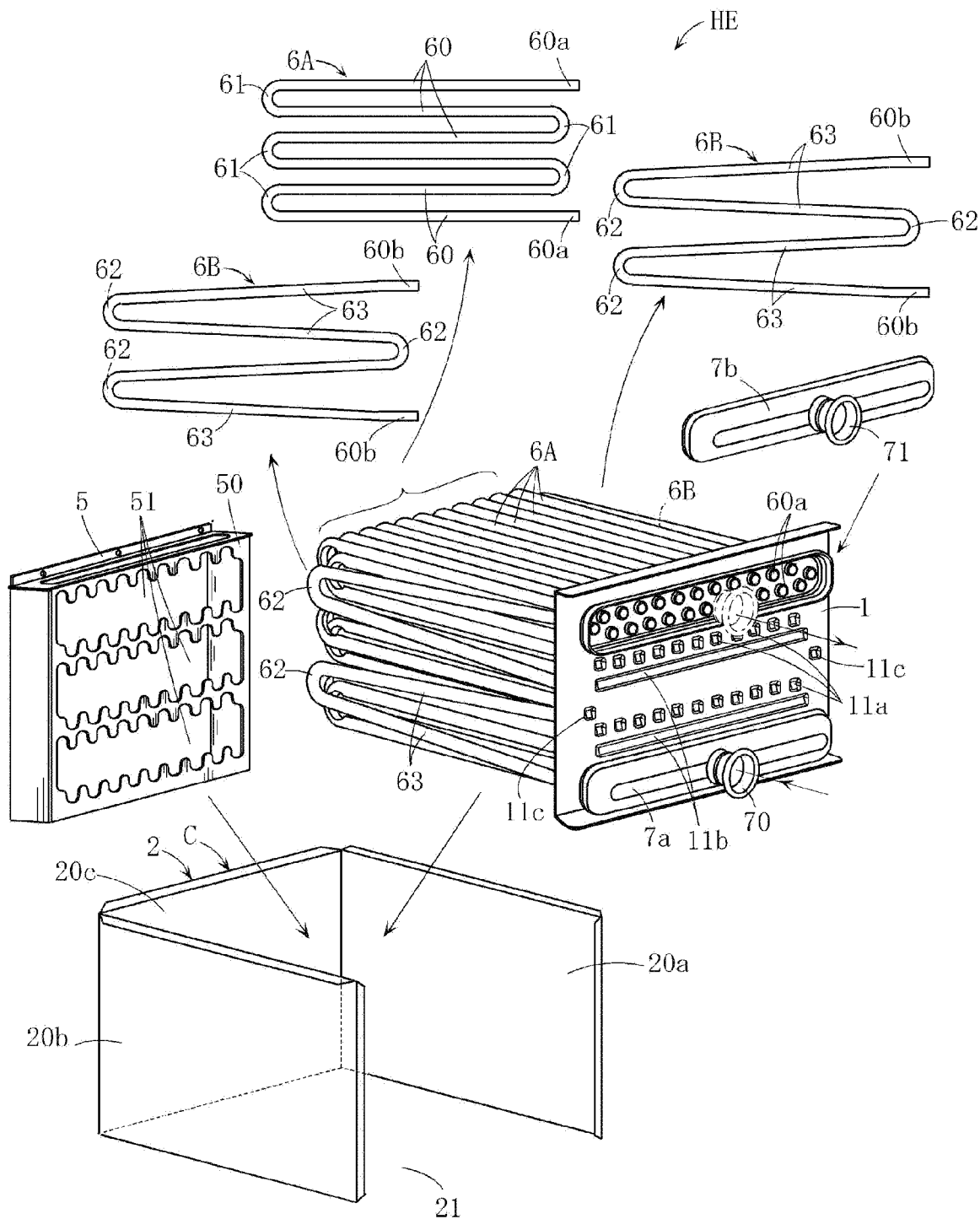
FIG. 2 is an exploded perspective view of FIG. 1.

As clearly shown in FIG. 2, the case C is configured by combining a case main body 2 having a substantially U shape in the plan view and a first side wall 1 serving as a side plate portion provided with the header portions 7a and 7b. The case main body 2 includes three side walls 20 (20a to 20c) connected in a substantially U shape in the plan view so as to form a side surface opening 21 on one side surface. Among these, the side wall 20c facing the first side wall 1 corresponds to a second side wall in the disclosure. The first side wall 1 is welded to the case main body 2 so as to close the side surface opening 21. Further, two end portions 60a and 60b of the first and second heat transfer tubes 6A and 6B in the longitudinal direction pass through and are joined to the first side wall 1, and the details thereof will be described later.

The first and second heat transfer tubes 6A and 6B are serpentine heat transfer tubes. More specifically, as shown in FIG. 2 and FIG. 4, the first heat transfer tube 6A has a serpentine shape in which a plurality of straight tube bodies 60, which extend in the horizontal direction and are arranged at intervals in the vertical height direction, are connected in a series via a plurality of connecting tube bodies 61 having a semi-arc shape in the side view (FIG. 4 shows that two first heat transfer tubes 6A overlap each other, and since it is difficult to distinguish them from each other, one of them is applied with a halftone dot pattern). The two end portions 60a of the first heat transfer tube 6A in the longitudinal direction are inserted into the holes 10a provided in the first side wall 1 and pulled out to the outside of the case C, and are connected to the header portions 7a and 7b provided on the outer surface side of the first side wall 1. Further, the peripheral edge portion of the hole 10a of the first side wall 1 and the end portion 60a of the first heat transfer tube 6A are joined to each other via a brazing portion Ba. A plurality of first heat transfer tubes 6A are arranged in the case C at intervals in the width direction thereof. However, in order to increase the heat recovery amount, as shown in FIG. 3, the plurality of first heat transfer tubes 6A have a staggered arrangement in which there is a level difference between the first heat transfer tubes 6A adjacent to each other.

As shown in FIG. 2 and FIG. 5, the second heat transfer tube 6B has a serpentine shape in which a plurality of straight tube bodies 63, which extend in a direction intersecting the vertical height direction to be inclined vertically with respect to the horizontal direction and are arranged at intervals in the vertical height direction, are connected in a series via a plurality of connecting tube bodies 62 having a semi-arc shape in the side view. The two end portions 60b of the second heat transfer tube 6B are connected to the header portions 7a and 7b and are joined to the first side wall 1 in the same manner as the first heat transfer tube 6A. This joining is configured by inserting the end portion 60b into the hole 10b provided in the first side wall 1, and disposing a brazing portion Bb for joining the peripheral edge portion of the hole 10b and the end portion 60b.

Since each straight tube body 63 is inclined vertically, the second heat transfer tube 6B has good drainage properties, and even when the inside of the first heat transfer tube 6A freezes in winter, hot water can flow through the second heat transfer tube 6B to achieve supply of hot water. Unheated water is supplied to a water inlet 70 of the header portion 7a, and the hot water heated through the first and second heat transfer tubes 6A and 6B reaches the header portion 7b and is discharged from a hot water outlet 71. As shown in FIG.

2 and FIG. 3, the second heat transfer tubes 6B are provided to be located on both the left and right outer sides of the plurality of first heat transfer tubes 6A in the width direction of the case C.

As shown in FIG. 4 to FIG. 6, a plurality of heat transfer tube support portions 11a to 11c are provided on the first side wall 1 of the case C. The plurality of heat transfer tube support portions 11a to 11c are portions for preventing the portions of the first and second heat transfer tubes 6A and 6B near the first side wall 1 from descending below a predetermined height (first predetermined height). In addition, all of these are portions integrally formed on the first side wall 1 by applying press processing on the first side wall 1, and a part of the first side wall 1 is a convex portion partially protruding toward the inner side of the case C. Therefore, on the outer surface side of the first side wall 1, the portions where the heat transfer tube support portions 11a to 11c are provided are concave portions recessed toward the inner side of the case C.

The plurality of heat transfer tube support portions 11a to 11c will be described in more detail. First, in FIG. 3 and FIG. 4, the plurality of first heat transfer tubes 6A can be divided into groups of two types, an upper stage side where the staggered arrangement is high and a lower stage side where the staggered arrangement is low. A plurality of heat transfer tube support portions 11a are individually provided on the lower side of the connecting tube bodies 61 near the first side wall 1 of the plurality of first heat transfer tubes 6A on the upper stage side. The upper surface portion of the heat transfer tube support portion 11a opposingly contacts or opposingly approaches the lower surface portion of the connecting tube body 61, and prevents the connecting tube body 61 from descending below the predetermined height.

A plurality of heat transfer tube support portions 11b are located on the lower side of the connecting tube bodies 61 near the first side wall 1 of the plurality of first heat transfer tubes 6A on the lower stage side, and the upper surface portion of the heat transfer tube support portion 11b is provided to opposingly contact or opposingly approach the the lower surface portion of the connecting tube body 61 and prevents the connecting tube body 61 from descending below the predetermined height. However, unlike the heat transfer tube support portion 11a described above, the heat transfer tube support portion 11b is not a so-called point-shaped convex portion, but a convex portion extending linearly in the width direction of the case C. Therefore, the heat transfer tube support portion 11b collectively opposingly contacts or opposingly approaches the lower surface portions of a plurality of connecting tube bodies 61 at substantially the same height.

As shown in FIG. 5, a plurality of heat transfer tube support portions 11c are located on the lower side of the connecting tube bodies 62 of a pair of second heat transfer tubes 6B near the first side wall 1, and the upper surface portion of the heat transfer tube support portion 11c opposingly contacts or opposingly approaches the lower surface portion of the connecting tube body 62 so as to prevent the connecting tube body 62 from descending below the predetermined height. The heat transfer tube support portion 11c is a so-called point-shaped convex portion like the heat transfer tube support portion 11a.

In FIG. 4, a support body 5 for heat transfer tube is a member for supporting portions of the plurality of first heat transfer tubes 6A near the second side wall 20c and preventing these portions from descending below a predetermined height (second predetermined height), and is arranged in the case C. In the present embodiment, as shown in FIG. 5, the support body 5 does not support the second heat transfer tube 6B. Further, a support body for supporting the portion of the second heat transfer tube 6B near the second side wall 20c is not provided. The second heat transfer tube 6B is short in length compared with the plurality of first heat transfer tubes 6A, and is less likely to be bent and deformed by its own weight. For such reasons, it is not necessary to use the support body 5 for the second heat transfer tube 6B. However, a support structure using the support body 5 can be applied to the second heat transfer tube 6B as to the first heat transfer tube 6A.

As shown in FIG. 4 and FIG. 7, the support body 5 for heat transfer tube has a configuration in which an opening 51 for inserting the portions of the first heat transfer tubes 6A near the second side wall 20c is formed in a plate-shaped portion 50 standing upright in the vertical height direction. The opening 51 corresponds to the arrangement of the first heat transfer tubes 6A, and the support body 5 regulates the positions of the first heat transfer tubes 6A. On the outer peripheral edge portion of the plate-shaped portion 50, a bent piece portion 53 bent with respect to the plate-shaped portion 50, a flange piece portion 54, etc. are appropriately connected, and the support body 5 is fixed by welding these portions to appropriate positions of the case C. The bent piece portion 53 on the upper side is provided with a ventilation opening 52 as a means for ensuring the flow of the combustion gas.

Next, the operation of the heat exchanger HE described above will be described.

When manufacturing the heat exchanger HE, brazing work for disposing the brazing portions Ba and Bb is carried out. During this brazing work, as shown in FIG. 4 and FIG. 5, the heat transfer tube support portions 11a to 11c are arranged on the lower surface side of the connecting tube bodies 61 and 62 of the first and second heat transfer tubes 6A and 6B near the first side wall 1. Therefore, even if the first and second heat transfer tubes 6A and 6B are softened by the heating using a brazing furnace, the connecting tube bodies 61 and 62 near the first side wall 1 are appropriately supported by the heat transfer tube support portions 11a to 11c, and thus are appropriately prevented from descending below the predetermined height due to their own weights. As a result, it is possible to appropriately avoid the brazing work from being carried out in a state where the first and second heat transfer tubes 6A and 6B are greatly distorted by their own weights, and prevent a large error from occurring in the arrangement of the first and second heat transfer tubes 6A and 6B. If the brazing work is carried out in a state where the first and second heat transfer tubes 6A and 6B are greatly distorted by their own weights, there is a risk that the distortion may have an effect even after the brazing work is finished, and a large error may occur in the arrangement of the first and second heat transfer tubes 6A and 6B. Further, such an error may cause a decrease in the heat exchange efficiency. In contrast, according to the present embodiment, it is possible to eliminate or reduce the above-mentioned risk. Furthermore, during the brazing work, the orientation or posture of the heat exchanger HE may be set to the original orientation or posture when it is used, which also has excellent flexibility.

In the present embodiment, the support body 5 for heat transfer tube can also prevent the portion of the first heat transfer tube 6A near the second side wall 20c from unreasonably greatly descending due to its own weight. Therefore, the distortion of the first heat transfer tube 6A can be further reduced, and the position accuracy of the first heat transfer tube 6A can be further improved. Further, the support body 5 for heat transfer tube can have an excellent performance in maintaining the positioning of the first heat transfer tube 6A while having a simple overall shape.

Regarding the heat transfer tube support portions 11a and 11b described above, the heat transfer tube support portion 11b extends linearly, and as compared with the case where the heat transfer tube support portions 11a and 11b are all formed into so-called point-shaped convex portions, for example, it is possible to simplify the overall configuration of the heat transfer tube support portions 11a and 11b, facilitate the processing, and reduce the processing costs. Furthermore, the heat transfer tube support portions 11a and 11b have an effect of improving the strength of the first side wall 1, but if the heat transfer tube support portion 11b extends linearly, the heat transfer tube support portion 11b also functions as a reinforcing rib and therefore has a better strength improving effect. If the heat transfer tube support portions 11a and 11b are both formed into a straight line extending in the width direction, which is different from the present embodiment, it is difficult to appropriately support each predetermined connecting tube body 61 of the plurality of first heat transfer tubes 6A. However, according to the present embodiment, there is no such problem.

FIG. 8 to FIG. 14 show other embodiments of the disclosure. In these figures, elements the same as or similar to those of the above embodiment are denoted by the same reference numerals, and the repeated description will be omitted.

On the first side wall 1 (plate-shaped portion) shown in FIG. 8, in addition to the heat transfer tube support portions 11a and 11c, the heat transfer tube support portion 11b is also formed into a so-called point-shaped convex portion. The disclosure can also have such a configuration.

The heat exchanger HE1 shown in FIG. 9 to FIG. 11 is configured as a so-called primary/secondary integrated heat exchanger in which a primary heat exchange unit and a secondary heat exchange unit are both incorporated in one case C1. More specifically, the heat exchanger HE1 has a configuration that the case C1 has a larger size than the case C of the previous embodiment, and a third heat transfer tube 3 and a body pipe 39 are provided above the first and second heat transfer tubes 6A and 6B. As indicated by the virtual lines in FIG. 10, the burner 80 is arranged on the upper side of the case C1, and the combustion gas is supplied downward into the case C1. The third heat transfer tube 3 corresponds to an example of the additional heat transfer tube referred to in the disclosure, and constitutes the primary heat exchange unit that recovers sensible heat from the combustion gas. The first and second heat transfer tubes 6A and 6B constitute the secondary heat exchange unit that recovers latent heat.

The body pipe 39 is arranged along the upper inner surface portion of the case C1, and as shown in FIG. 9, the hot water discharged from the hot water outlet 71 of the header portion 7b is sent from a supply port 38 to the body pipe 39 and flows in the direction indicated by the arrow in the figure, and also flows to header portions 35a and 35b for body pipe. The hot water flowing through these portions prevents the upper part of the case C1 from becoming overheated. The hot water that has passed through the body pipe 39 is then sent to the third heat transfer tube 3 to be further heated, and then discharged from the hot water outlet 37. As well shown in FIG. 10 and FIG. 11, the third heat transfer tube 3 includes a plurality of straight tube bodies 30 that penetrate through a plurality of plate-shaped fins 4 arranged in the horizontal direction, and a plurality of bent tubes 36 that connect the end portions of the plurality of tube bodies 30 to each other. The plurality of fins 4 and the tube bodies 30 are connected via a brazing portion Bc (corresponding to an additional brazing portion of the disclosure) as shown in (c) of FIG. 11.

In this heat exchanger HE1, the first side wall 1A of the case C1 has a form as shown in FIG. 12, and the range Sa shown in the figure has the same configuration as each part of the first side wall 1 shown in FIG. 6. Holes 19a and 19b for inserting the third heat transfer tube 3 and the body pipe 39 described above are provided in a range above the range Sa.

When manufacturing the heat exchanger HE1, in addition to disposing the brazing portions Ba and Bb described above, the brazing portion Bc is also disposed. The following is used as a method for disposing the brazing portion Bc. For example, as shown in (b) of FIG. 11, a brazing material B is heated and melted in a state of being placed on the upper side of the tube body 30, and the molten brazing material flows along the outer peripheral surface of the tube body 30 and the surface of the fin 4. In this case, the posture of the heat exchanger HE1 at the time of the brazing work needs to be set to the posture shown in FIG. 9 to FIG. 11, but even if the posture is set, the presence of the heat transfer tube support portions 11a to 11c appropriately prevents the first and second heat transfer tubes 6A and 6B from descending due to their own weights and being greatly distorted.

In the heat exchanger HE2 shown in FIG. 13, a partition member 85 and a bottom wall 86 are assembled to the case C1, and an exhaust port 87 for exhaust gas is provided on the side wall 20d. More specifically, in the heat exchanger HE2, the arrangement regions of the plurality of first and second heat transfer tubes 6A and 6B are divided into the first and second regions S1 and S2 by the partition member 85. When the combustion gas traveling downward into the case C1 passes through the first region S1 and reaches the bottom wall 86, the combustion gas makes a U-turn upward to enter the second region S2, and then is discharged to the outside from the exhaust port 87. The flow direction of the combustion gas may be changed as in the present embodiment. The burner can also be arranged on the lower side of the heat exchanger to allow the combustion gas to travel upward in the heat exchanger.

In the heat exchanger HE3 shown in FIG. 14, a plurality of heat transfer tubes 6C are arranged in the case C2 that has the side walls 20e and 20f formed with an air supply port 88a and an exhaust port 88b for combustion gas, but the plurality of heat transfer tubes 6C are serpentine tube bodies in a horizontal posture and are arranged at intervals in the vertical height direction. That is, the plurality of heat transfer tubes 6C are different in posture and arrangement direction from the first and second heat transfer tubes 6A and 6B described above. However, two end portions 60c of each heat transfer tube 6C are joined to the first side wall 1 of the case C2 via a brazing portion Bd. Further, the first side wall 1 is provided with header portions 7c and 7d having a water inlet 70 and a hot water outlet 71, and the inside thereof and the inside of each heat transfer tube 6C communicate with each other.

A plurality of heat transfer tube support portions 11d are integrally formed on the first side wall 1 by press processing. These heat transfer tube support portions 11d are convex portions that opposingly contact or opposingly approach the lower surface portions of the connecting tube bodies 61 of the plurality of heat transfer tubes 6C near the first side wall 1, and prevent the connecting tube bodies 61 from descending below a predetermined height. Further, although a support body 5A for heat transfer tube is also provided, the support body 5A has a configuration that the plate-shaped portion 50 is provided with a plurality of openings 51a into which the portions of the heat transfer tubes 6C near the second side wall 20c are inserted. The present embodiment can also achieve the intended effect of the disclosure.

The disclosure is not limited to the contents of the embodiments described above. The specific configuration of each part of the heat exchanger and the water heating device according to the disclosure can be designed and changed in various ways within the scope of the disclosure.

As the heat transfer tube, for example, a U-shaped tube can be used instead of the serpentine tube, and a heat transfer tube having another configuration such as the spiral tube shown in Patent Literature 1 can also be used.

The heat transfer tube support portion is not limited to the specific shape or size as long as the heat transfer tube support portion can support a predetermined portion of the heat transfer tube to prevent the predetermined portion of the heat transfer tube from descending below a predetermined height due to its own weight. Further, although it is desired that the heat transfer tube support portion is integrally formed on the first side wall of the case, the heat transfer tube support portion can also be provided by using another member. In addition, since the heat transfer tube support portion is a portion that can prevent the predetermined portion of the heat transfer tube from descending to or below a predetermined height, the heat transfer tube support portion may not be provided in contact with the predetermined portion of the heat transfer tube in a normal state, and may either opposingly contact or opposingly approach the predetermined portion.

The heating medium referred to in the disclosure is not limited to the combustion gas generated by the burner, and may be high-temperature exhaust gas or the like. The water heating device referred to in the disclosure is a concept including not only a hot water supply device for general hot water supply and bath hot water supply, but also a water heating device for hot water heating or snow melting. When manufacturing the heat exchanger according to the disclosure, it is also possible to braze two end portions of the heat transfer tube in the longitudinal direction to the first side wall in a state where the heat transfer tube is only supported by the first side wall, for example (a state where the other side walls of the case are not attached to the first side wall). In this case, it is also possible to support the portion of the heat transfer tube near the first side wall and the portion on the opposite side by using an appropriate jig.

What is claimed is:

1. A heat exchanger, comprising:
    a case which has a first side wall that stands upright in a vertical height direction and to which a heating medium is supplied inside; and
    a plurality of serpentine heat transfer tubes for heating hot water, in which a plurality of straight tube bodies that extend in a direction intersecting the vertical height direction and are arranged at intervals in the vertical height direction are connected in a series via a plurality of connecting tube bodies, in the case,
    wherein the plurality of heat transfer tubes are arranged in a width direction of the case and housed,
    two end portions of each of the heat transfer tubes in a longitudinal direction are joined to the first side wall via a brazing portion, and the heat transfer tubes are respectively supported by the first side wall, and
    the heat exchanger further comprises a plurality of heat transfer tube support portions which are provided on the first side wall and opposingly contact or opposingly approach lower surface portions of the plurality of connecting tube bodies for supporting the plurality of connecting tube bodies, located near the first side wall, of the plurality of heat transfer tubes so as to prevent the plurality of connecting tube bodies located near the first side wall from descending below a first predetermined height.

2. The heat exchanger according to claim 1, wherein each of the heat transfer tube support portions is formed as a convex portion integrally formed on the first side wall so that a part of the first side wall partially protrudes toward an inner side of the case.

3. The heat exchanger according to claim 1, wherein the case has a second side wall which faces the first side wall and is separated from the first side wall, and
    the heat exchanger further comprises a heat transfer tube support body for supporting a portion of the heat transfer tube near the second side wall so as to prevent the portion near the second side wall from descending below a second predetermined height.

4. The heat exchanger according to claim 2, wherein the case has a second side wall which faces the first side wall and is separated from the first side wall, and
    the heat exchanger further comprises a heat transfer tube support body for supporting a portion of the heat transfer tube near the second side wall so as to prevent the portion near the second side wall from descending below a second predetermined height.

5. The heat exchanger according to claim 3, wherein the heat transfer tube support body has a configuration which has a plate-shaped portion located in the case in a posture of standing upright in the vertical height direction that is a flow direction of the heating medium, and in which the plate-shaped portion is formed with an opening for inserting the portion of the heat transfer tube near the second side wall.

6. The heat exchanger according to claim 4, wherein the heat transfer tube support body has a configuration which has a plate-shaped portion located in the case in a posture of standing upright in the vertical height direction that is a flow direction of the heating medium, and in which the plate-shaped portion is formed with an opening for inserting the portion of the heat transfer tube near the second side wall.

7. The heat exchanger according to claim 1, wherein at least one heat transfer tube support portion of the plurality of heat transfer tube support portions is provided in a form which extends in the width direction of the case so as to opposingly contact or opposingly approach the lower surface portions of the plurality of connecting tube bodies.

8. The heat exchanger according to claim 1, wherein an additional heat transfer tube is arranged in a region different from an arrangement region of the heat transfer tube in the case, and heat recovery from the heating medium is enabled by both of the heat transfer tubes and the additional heat transfer tube, and
    the additional heat transfer tube has a plurality of tube bodies which penetrate through a plurality of fins arranged in the direction intersecting the vertical height direction, and the plurality of tube bodies and the plurality of fins are joined to each other via an additional brazing portion.

9. The heat exchanger according to claim 2, wherein an additional heat transfer tube is arranged in a region different from an arrangement region of the heat transfer tube in the case, and heat recovery from the heating medium is enabled by both of the heat transfer tubes and the additional heat transfer tube, and the additional heat transfer tube has a plurality of tube bodies which penetrate through a plurality of fins arranged in the direction intersecting the vertical height direction, and the plurality of tube bodies and the plurality of fins are joined to each other via an additional brazing portion.

10. The heat exchanger according to claim 3, wherein an additional heat transfer tube is arranged in a region different from an arrangement region of the heat transfer tube in the case, and heat recovery from the heating medium is enabled by both of the heat transfer tubes and the additional heat transfer tube, and the additional heat transfer tube has a plurality of tube bodies which penetrate through a plurality of fins arranged in the direction intersecting the vertical height direction, and the plurality of tube bodies and the plurality of fins are joined to each other via an additional brazing portion.

11. The heat exchanger according to claim 4, wherein an additional heat transfer tube is arranged in a region different from an arrangement region of the heat transfer tube in the case, and heat recovery from the heating medium is enabled by both of the heat transfer tubes and the additional heat transfer tube, and the additional heat transfer tube has a plurality of tube bodies which penetrate through a plurality of fins arranged in the direction intersecting the vertical height direction, and the plurality of tube bodies and the plurality of fins are joined to each other via an additional brazing portion.

12. The heat exchanger according to claim 5, wherein an additional heat transfer tube is arranged in a region different from an arrangement region of the heat transfer tube in the case, and heat recovery from the heating medium is enabled by both of the heat transfer tubes and the additional heat transfer tube, and the additional heat transfer tube has a plurality of tube bodies which penetrate through a plurality of fins arranged in the direction intersecting the vertical height direction, and the plurality of tube bodies and the plurality of fins are joined to each other via an additional brazing portion.

13. The heat exchanger according to claim 6, wherein an additional heat transfer tube is arranged in a region different from an arrangement region of the heat transfer tube in the case, and heat recovery from the heating medium is enabled by both of the heat transfer tubes and the additional heat transfer tube, and the additional heat transfer tube has a plurality of tube bodies which penetrate through a plurality of fins arranged in the direction intersecting the vertical height direction, and the plurality of tube bodies and the plurality of fins are joined to each other via an additional brazing portion.

14. The heat exchanger according to claim 7, wherein an additional heat transfer tube is arranged in a region different from an arrangement region of the heat transfer tube in the case, and heat recovery from the heating medium is enabled by both of the heat transfer tubes and the additional heat transfer tube, and the additional heat transfer tube has a plurality of tube bodies which penetrate through a plurality of fins arranged in the direction intersecting the vertical height direction, and the plurality of tube bodies and the plurality of fins are joined to each other via an additional brazing portion.

15. A water heating device, comprising the heat exchanger according to claim 1.

* * * * *